United States Patent
Bassett et al.

(10) Patent No.: US 8,195,916 B2
(45) Date of Patent: Jun. 5, 2012

(54) APPARATUS AND METHOD TO TRANSLATE VIRTUAL ADDRESSES TO PHYSICAL ADDRESSES IN A BASE PLUS OFFSET ADDRESSING MODE

(75) Inventors: Paul Douglas Bassett, Austin, TX (US); Ajay Anant Ingle, Austin, TX (US); Sujat Jamil, Gilbert, AZ (US); Lucian Codrescu, Austin, TX (US); Muhammad Ahmed, Hayward, CA (US)

(73) Assignee: QUALCOMM Incorporated, San Diego, CA (US)

(*) Notice: Subject to any disclaimer, the term of this patent is extended or adjusted under 35 U.S.C. 154(b) by 450 days.

(21) Appl. No.: 12/397,438

(22) Filed: Mar. 4, 2009

(65) Prior Publication Data

US 2010/0228944 A1  Sep. 9, 2010

(51) Int. Cl.
*G06F 12/00* (2006.01)
(52) U.S. Cl. .............. 711/207; 711/205; 711/E12.061
(58) Field of Classification Search .................. None
See application file for complete search history.

(56) References Cited

U.S. PATENT DOCUMENTS

| | | | |
|---|---|---|---|
| 5,335,333 A * | 8/1994 | Hinton et al. | 711/207 |
| 5,465,337 A | 11/1995 | Kong | |
| 5,490,259 A | 2/1996 | Hiraoka | |
| 5,502,829 A | 3/1996 | Sachs | |
| 5,548,739 A | 8/1996 | Yung | |
| 5,630,088 A | 5/1997 | Gupta et al. | |
| 5,940,873 A | 8/1999 | Mou | |
| 6,625,715 B1 | 9/2003 | Mathews | |
| 2007/0186074 A1 * | 8/2007 | Bradford et al. | 711/202 |
| 2010/0195379 A1 * | 8/2010 | Rao et al. | 365/171 |

FOREIGN PATENT DOCUMENTS

GB   2261087   5/1993

OTHER PUBLICATIONS

International Search Report—PCT/ US2010/026249, International Search Authority—European Patent Office May 31, 2010.
Written Opinion—PCT/ US2010/026249, International Search Authority—European Patent Office May 31, 2010.

\* cited by examiner

*Primary Examiner* — Reginald Bragdon
*Assistant Examiner* — Aracelis Ruiz
(74) *Attorney, Agent, or Firm* — Peter Michael Kamarchik; Nicholas J. Pauley; Jonathan T. Velasco

(57) ABSTRACT

An apparatus and method to translate virtual addresses to physical addresses in a base plus offset addressing mode are disclosed. In an embodiment, a method includes performing a first translation lookaside buffer (TLB) lookup based on a base address value to retrieve a speculative physical address. While performing the TLB lookup based on the base address value, the base address value is added to an offset value to generate an effective address value. The method also includes performing a comparison of the base address value and the effective address value based on a variable page size to determine whether the speculative physical address corresponds to the effective address.

65 Claims, 7 Drawing Sheets

APPARATUS AND METHOD TO TRANSLATE VIRTUAL ADDRESSES TO PHYSICAL ADDRESSES IN A BASE PLUS OFFSET ADDRESSING MODE

I. FIELD

The present disclosure is generally related to an apparatus and method to translate virtual addresses to physical addresses in a base plus offset addressing mode.

II. DESCRIPTION OF RELATED ART

Advances in technology have resulted in smaller and more powerful personal computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Processes that are executed at a portable computing device may reference data and instructions using virtual addresses that are translated to physical addresses for processing. Translation lookaside buffers (TLBs) can store data for quickly translating virtual addresses to physical addresses and can improve application performance by reducing delays associated with translating virtual addresses. However, power consumption can also be increased by operation of a TLB. Increased power consumption can cause a corresponding decrease in an operating time of a portable personal computing device before battery replacement or recharging is required.

III. SUMMARY

In a particular embodiment, a method is disclosed that includes performing a first translation lookaside buffer (TLB) lookup based on a base address value to retrieve a speculative physical address. While performing the TLB lookup based on the base address value, the base address value is added to an offset value to generate an effective address value. The method also includes performing a comparison of the base address value and the effective address value based on a variable page size to determine whether the speculative physical address corresponds to the effective address.

In another embodiment, the method includes receiving a base address and an offset and selectively providing the base address without the offset to a translation lookaside buffer (TLB) to perform a first lookup operation.

In another embodiment, an apparatus is disclosed including a control circuit configured to receive a base address and an offset and to selectively provide the base address but not the offset to a translation lookaside buffer (TLB) to perform a first lookup operation. The TLB includes at least a first entry corresponding to a first page having a first page size and a second entry corresponding to a second page having a second page size. The first page size is different from the second page size.

In another embodiment, the apparatus includes input logic configured to receive a base address and an offset. A translation lookaside buffer (TLB) is coupled to the input logic and is configured to perform a first lookup operation. The input logic is configured to selectively provide the base address but not the offset to the TLB to perform the first lookup operation. The input logic is further configured to add the base address and the offset while the TLB performs the first lookup based on the base address to generate an effective address. The TLB includes a first entry corresponding to a first page having a first page size and a second entry corresponding to a second page having a second page size. The first page size is different from the second page size. Output logic is coupled to the TLB and to the input logic. The output logic is configured to determine whether a speculative physical address resulting from the first lookup operation is correct.

In another embodiment, an apparatus is disclosed including a translation lookaside buffer (TLB) configured to provide address translations of a variable page size memory. The TLB is configured to perform a translation of a base address to a speculative physical address. An adder is configured to receive the base address and an offset value and to generate an effective address. A comparison circuit is configured to compare the base address to the effective address to determine whether the translation of the base address is valid.

One particular advantage provided by disclosed embodiments is faster detection of a valid translation lookaside buffer match, which may reduce power consumption.

IV. BRIEF DESCRIPTION OF THE DRAWINGS

V. DETAILED DESCRIPTION

Figure 1:
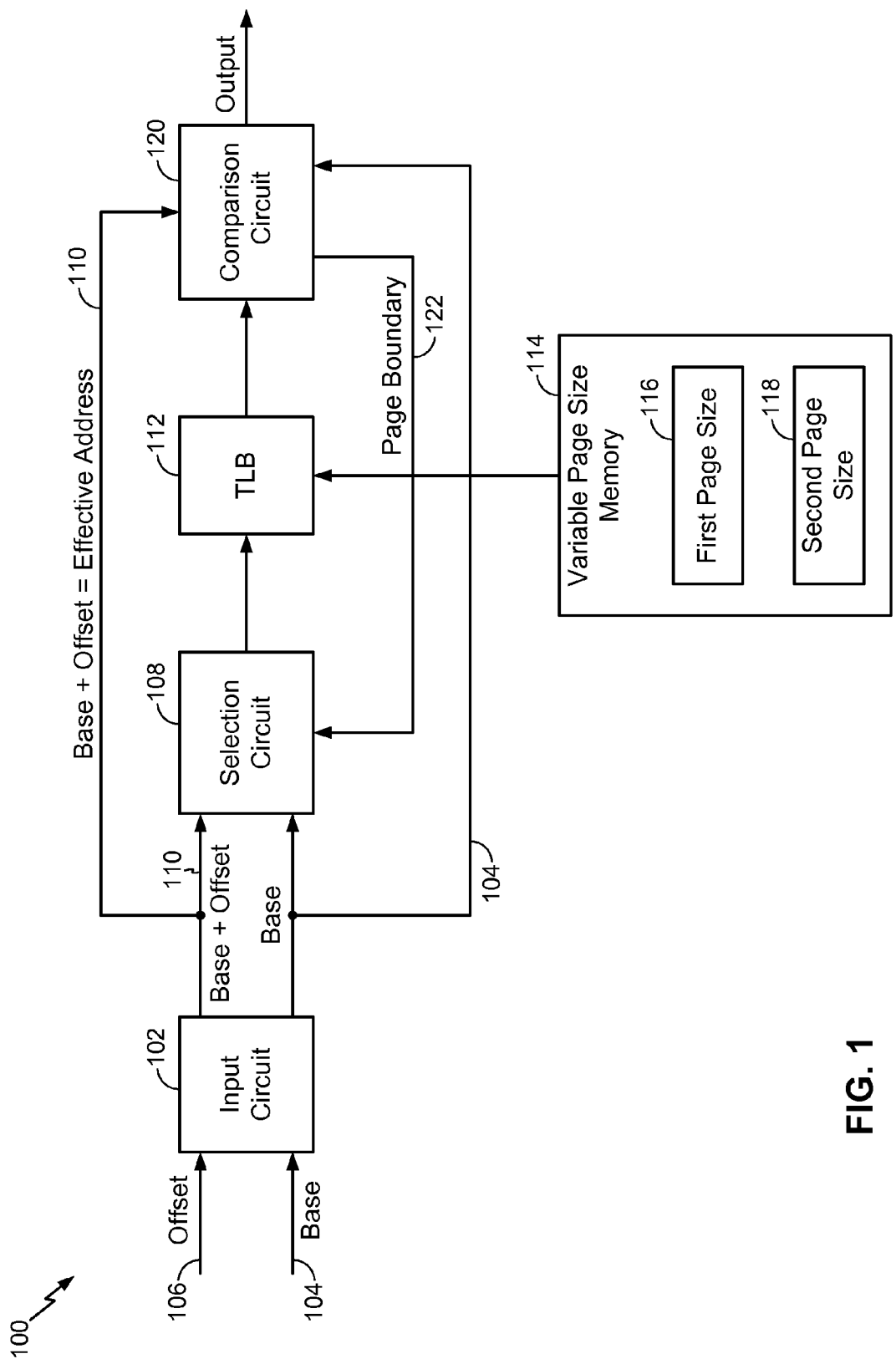
FIG. 1 is a block diagram of an illustrative embodiment of a system that translates virtual addresses to physical addresses in a base plus offset addressing mode.

Referring to FIG. 1, an illustrative embodiment of a system that translates virtual addresses to physical addresses in a base plus offset addressing mode is depicted and generally designated 100. The system 100 includes an input circuit 102 configured to receive a base address value 104 and an offset value 106. The input circuit 102 is coupled to a selection circuit 108. The selection circuit 108 has as inputs the base address value 104 and a base plus offset (or effective address) value 110. The selection circuit 108 is coupled to a translation lookaside buffer (TLB) 112 and has an input to receive a page boundary signal 122 from a comparison circuit 120. A variable page size memory 114 is coupled to the TLB 112. The variable page size memory 114 includes a first entry 116 corresponding to a first page having a first page size and a second entry 118 corresponding to a second page having a second page size. Although two representative entries 116 and 118 are depicted in the system 100, it will be understood that the variable page size memory 114 may include any number of entries.

In a particular embodiment, the input circuit 102 is configured to receive the base address value 104, to receive the offset value 106, to output the base address value 104, and to generate the effective address value 110 by adding the base address value 104 and the offset value 106. The effective address value 110 is received by the selection circuit 108 and is received by the comparison circuit 120. In a particular embodiment, the selection circuit 108 is configured to receive the base address value 104 and the effective address value 110 and is configured to selectively provide the base address value 104 or the effective address value 110 to the TLB 112.

In a particular embodiment, the TLB 112 is configured to return a physical address that corresponds to a virtual address that is stored at the TLB 112. The TLB 112 is configured to receive the base address value 104 or the effective address value 110 from the selection circuit 108. The TLB 112 is further configured to receive an output from the variable page size memory 114. The TLB 112 is further configured to output a result of a first TLB lookup to the comparison circuit 120. The output of the first TLB lookup is based on the received base address value 104 or the received effective address value 110. In a particular embodiment, the variable page size is retrieved via the first TLB lookup. In a particular embodiment, the first TLB lookup is performed substantially concurrently with the generation of the effective address value 110.

In a particular embodiment, the comparison circuit 120 is configured to receive the base address value 104, to receive the effective address value 110, and to receive the output from the TLB 112. The comparison circuit 120 is configured to compare the base address value 104 and the effective address value 110 to determine whether a speculative translation of the base address value 104 is valid by determining whether a page boundary has been crossed. The page boundary signal 122 is output from the comparison circuit 120 and received by the selection circuit 108. If a page boundary has been crossed, then the speculative physical address resulting from the first lookup operation is not correct or is not valid, and the selection circuit 108 provides the effective address 110 to the TLB 112 to perform a second lookup operation based on the effective address 110 to determine the physical address.

By performing a speculative translation of the base address while the effective address is being generated, the system 100 may provide a potential time savings since the addition operation of the base address value 104 and the offset value 106 does not occur prior to the first TLB lookup.

Figure 2:
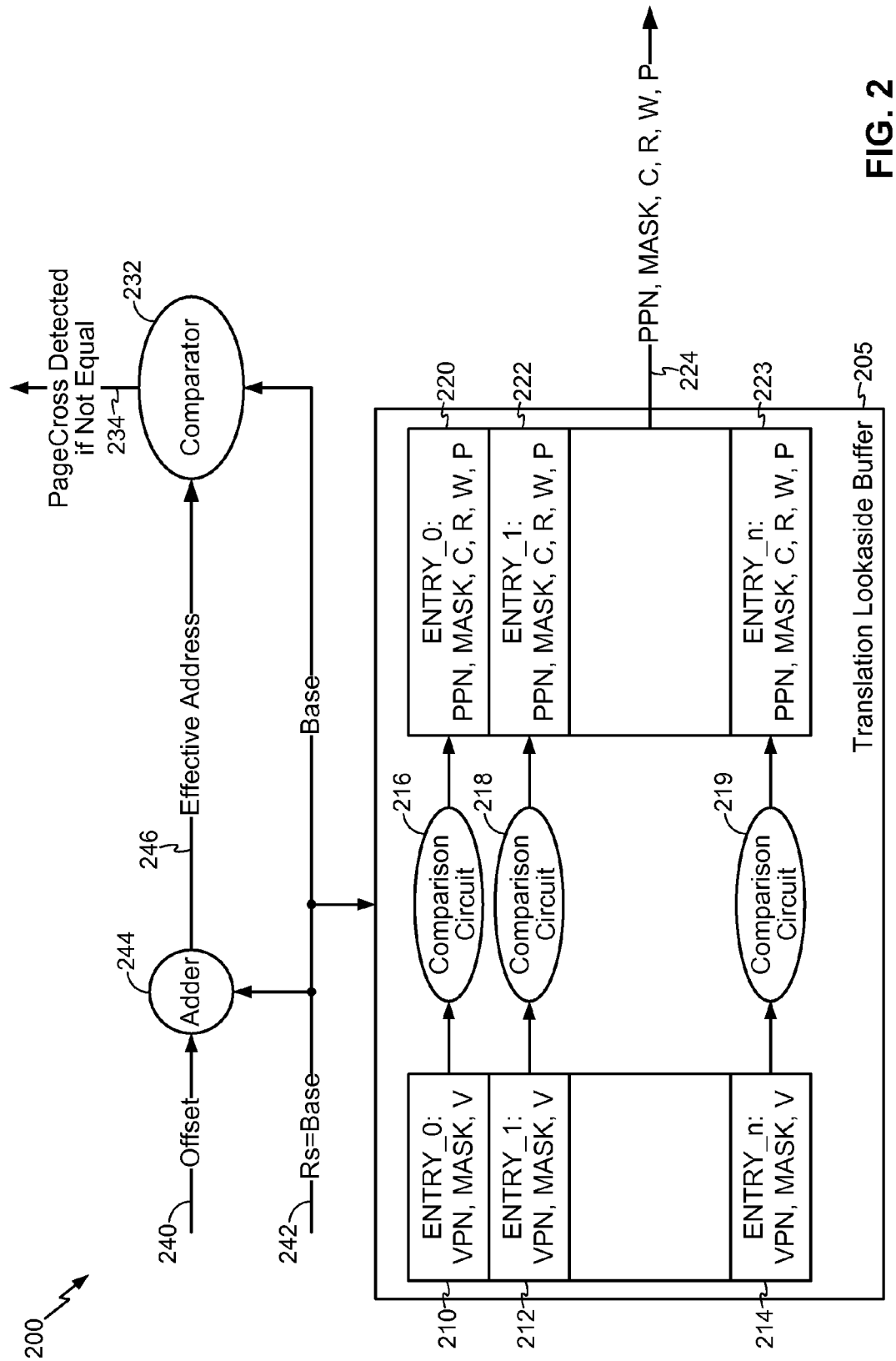
FIG. 2 is a block diagram of a second embodiment of a system that translates virtual addresses to physical addresses in a base plus offset addressing mode.

Referring to FIG. 2, a second illustrative embodiment of a system that translates virtual addresses to physical addresses in a base plus offset addressing mode is depicted and generally designated 200. The system 200 includes an adder 244 configured to receive a base address 242 and to receive an offset value 240. The adder 244 adds the base address 242 and the offset value 240 and generates an effective address 246. The effective address 246 and the base address 242 are input to a comparator 232. The base address 242 is also input to a translation lookaside buffer (TLB) 205. The comparator 232 is configured to compare the base address 242 and the effective address 246 to determine whether a speculative translation of the base address 242 is valid by determining whether a page boundary has been crossed.

The TLB 205 includes one or more TLB entries to store data for translating virtual addresses to physical addresses. In a particular embodiment, a "virtual side" of the TLB 205 includes a first entry 210, a second entry 212, and a third entry 214. Each of the entries 210-214 includes a virtual page number (VPN), a mask, and a valid bit V. In a particular embodiment, the mask for each entry 210-214 is associated with a page size of a page in a variable page size memory. For example, the first entry 210 includes data corresponding to a first page having a first page size. The second entry 212 includes data corresponding to a second page having a second page size, where the first page size is different from the second page size. A first comparison circuit 216, such as a comparator, is coupled to the first entry 210, a second comparison circuit 218, such as a comparator, is coupled to the second entry 212, and a third comparison circuit 219, such as a comparator, is coupled to the third entry 214. A "physical side" of the TLB 205 includes a first entry 220, a second entry 222, and a third entry 223. Each of the entries 220-223 includes a payload comprising a physical page number (PPN), a mask, a cacheability bit (C), a read bit (R), a write bit (W), and a permission bit (P). Although three representative virtual side entries 210-214 and three representative physical side entries 220-223 are depicted in the system 200, it will be understood that the TLB 205 may include any number of entries/page sizes.

In a particular embodiment, the TLB 205 is software programmable such that each of the entries of the TLB 205 may be populated by a software program. The TLB 205 is configured to perform a lookup operation based on the base address 242 to retrieve a speculative physical address. The entry corresponding to the base address 242 is retrieved via the TLB 205 by assuming the smallest page size and by masking off the appropriate page offset bits of the base address 242 before comparing with the VPN of the corresponding entry 210-214. An entry match is detected if the VPN matches the masked base address. If there is a match, then the payload containing the PPN, mask, C, R, W, and P bits of the corresponding physical side entry 220-223 is selected and is output 224 from the TLB 205. The physical address is computed as the physical page number for the higher bits, and the effective address for the lower bits.

The lowest bits of the base address 242 and the lowest bits of the effective address 246 are masked off before comparing the base address and the effective address via comparator 232. The comparator 232 is configured to compare the base address 242 and the effective address 246 to determine whether a speculative translation of the base address 242 is valid by determining whether a page boundary has been crossed. A page cross detect signal 234 is output from the comparator 232. If the page boundary has been crossed, then the speculative physical address resulting from the first lookup If the effective address 246 is within the same page as the base address 242, then the TLB lookup using only the base address 242 provides a correct or valid physical address without first resolving the effective address 246, which may provide a potential time savings since the addition operation of the base address 242 and the offset value 240 does not occur prior to the first TLB lookup.

Figure 3:
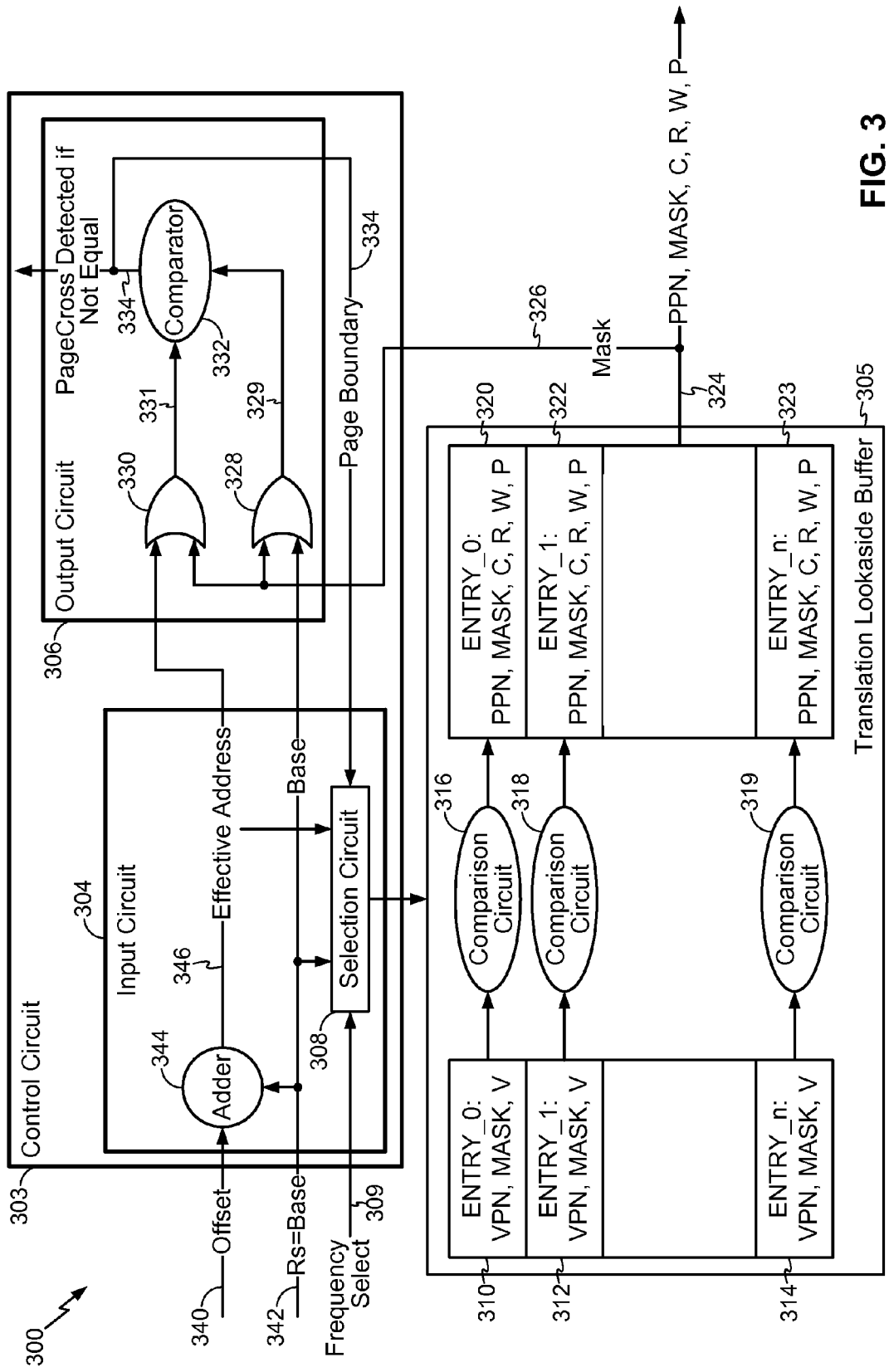
FIG. 3 is a block diagram of a third embodiment of a system that translates virtual addresses to physical addresses in a base plus offset addressing mode.

Referring to FIG. 3, a third illustrative embodiment of a system that translates virtual addresses to physical addresses in a base plus offset addressing mode is depicted and generally designated 300. The system 300 includes a control circuit 303 configured to receive a base address 342 and to receive an offset 340. The control circuit 303 is coupled to a translation lookaside buffer (TLB) 305. In a particular embodiment, the control circuit 303 includes an input circuit 304 coupled to an output circuit 306. In a particular embodiment, the control circuit 303 is configured to receive the base address 342, to receive the offset 340, and to selectively provide the base address 342 but not the offset 340 to the TLB 305 to perform a first lookup operation.

In a particular embodiment, the input circuit 304 includes an adder 344 configured to receive the base address 342 and to receive the offset value 340. The adder 344 adds the base address 342 and the offset value 340 and generates an effective address 346. The effective address 346 and the base address 342 are provided to the output circuit 306. The output circuit 306 includes a first OR gate 328 coupled to a comparator 332 and a second OR gate 330 coupled to the comparator 332. As will be discussed, the output circuit 306 is configured to generate a page boundary signal 334 when the effective address 346 and the base address 342 are on different pages (i.e. the offset value 340 crosses the page boundary).

The input circuit 304 also includes a selection circuit 308. The selection circuit 308 is configured to receive the base address 342, to receive the effective address 346, and to receive a frequency control signal 309. In a particular embodiment, the frequency control signal 309 is based on a system frequency. The selection circuit 308 is configured to selectively provide the base address 342 but not the offset, or the effective address 346, to the TLB 305 based on the frequency control signal 309 and the page boundary signal 334. In a particular embodiment, the selection circuit 308 is a multiplexer.

The TLB 305 includes one or more TLB entries to store data for translating virtual addresses to physical addresses. In a particular embodiment, a "virtual side" of the TLB 305 includes a first entry 310, a second entry 312, and a third entry 314. Each of the entries 310-314 includes a virtual page number (VPN), a mask, and a valid bit V. In a particular embodiment, the mask stored with the VPN and the valid (V) bit for each entry 310-314 corresponds to a page size of a page in a variable page size memory. For example, the first entry 310 corresponds to a first page having a first page size. The second entry 312 corresponds to a second page having a second page size, where the first page size is different from the second page size. A first comparison circuit 316, such as a comparator, is coupled to the first entry 310, a second comparison circuit 318, such as a comparator, is coupled to the second entry 312, and a third comparison circuit 319, such as a comparator, is coupled to the third entry 314. A "physical side" of the TLB 305 includes a first entry 320, a second entry 322, and a third entry 323. Each of the entries 320-323 includes a payload comprising a physical page number (PPN) and a mask, and may include additional data such as a cacheability bit (C), a read bit (R), a write bit (W), and a permission bit (P). In a particular embodiment, the TLB 305 is software programmable such that each of the entries of the TLB 305 may be populated by a software program. Although three representative virtual side entries 310-314 and three representative physical side entries 320-323 are depicted in the system 300, it will be understood that the TLB 305 may include any number of entries/page sizes.

The TLB 305 is configured to perform a lookup operation based on the base address 342 to retrieve a speculative physical address. The entry corresponding to the base address 342 is retrieved via the TLB 305 by masking off the appropriate page offset bits of the VPN of each entry 310-314 using the corresponding entry mask to compare with the base address 342. An entry match is detected if the masked VPN matches the base address. If there is a match, then the payload containing the PPN, mask, C, R, W, and P bits of the corresponding physical side entry 320-323 is selected and is provided as an output 324 from the TLB 305. The physical address may be computed as the physical page number for the higher bits, and the effective address for the lower bits.

The mask 326 from the selected payload is received by the output circuit 306 as an input to the first OR gate 328 and as an input to the second OR gate 330. The first OR gate 328 performs a bitwise OR operation to modify the base address 342 based on the mask 326 and outputs a modified base address 329. The second OR gate 330 performs a bitwise OR operation to modify the effective address 346 based on the mask 326 and outputs a modified effective address 331. Because the mask 326 is retrieved via the first TLB lookup and is associated with the first page size, the modified base address 329 and the modified effective address 331 can be compared by comparator 332 to determine whether a page boundary has been crossed. A page boundary signal 334 is output from the comparator 332 and received by the selection circuit 308. If a page boundary has been crossed, then the speculative physical address resulting from the first lookup operation is incorrect or not valid, and the selection circuit 308 provides the effective address 346 to the TLB 305 to perform a second lookup operation based on the effective address 346 to determine the physical address.

The comparison of the base address and the effective address is used to determine whether a page boundary has been crossed by using the mask of the entry selected by the base address via the TLB lookup to mask off the page cross over compare. In other words, if the base address belongs to a certain page then it may be likely that the base address+offset will belong to the same page. If not, then the non-masked higher bits of the base address will be different than the non-masked higher bits of the base address+offset to allow detection of an actual page boundary cross over. For example, if the base address+offset is frequently within the smallest page of the base address, then the TLB lookup based on the base address may be sufficient to speed up the process of detecting a valid TLB match since the addition of the base address+offset to obtain the effective address does not occur prior to the TLB lookup. This may reduce a delay in determining the physical address and improve overall processing speed.

However, in certain embodiments a processor frequency may be such that greater overall speed may be obtained by not first performing a TLB lookup using the base address 342. In a particular embodiment, system frequency may be a factor in determining whether the first TLB lookup is based on the base address 342 or whether the first TLB lookup is based on the effective address 346, since a potential time savings may not be as advantageous when the system frequency is low. For example, when the system frequency is high, it may be advantageous to perform the TLB lookup based on the base address 342 substantially concurrently with generating the effective address 346 for the potential time savings of not having to perform an addition operation prior to the first TLB lookup. When the system frequency is low, it may be advantageous to generate the effective address 346 and then perform the TLB lookup based on the effective address 346 since with a low system frequency, time savings may not be as important of a factor as saving power by doing a single TLB lookup since a plurality of content addressable memory cells may be discharging during each TLB lookup. A frequency control input 309 based on a system frequency is received by selection circuit 308. Selection circuit 308 selectively provides base address 342 or effective address 346 to TLB 305, and the first TLB lookup is performed based on the frequency control input 309.

Figure 4:
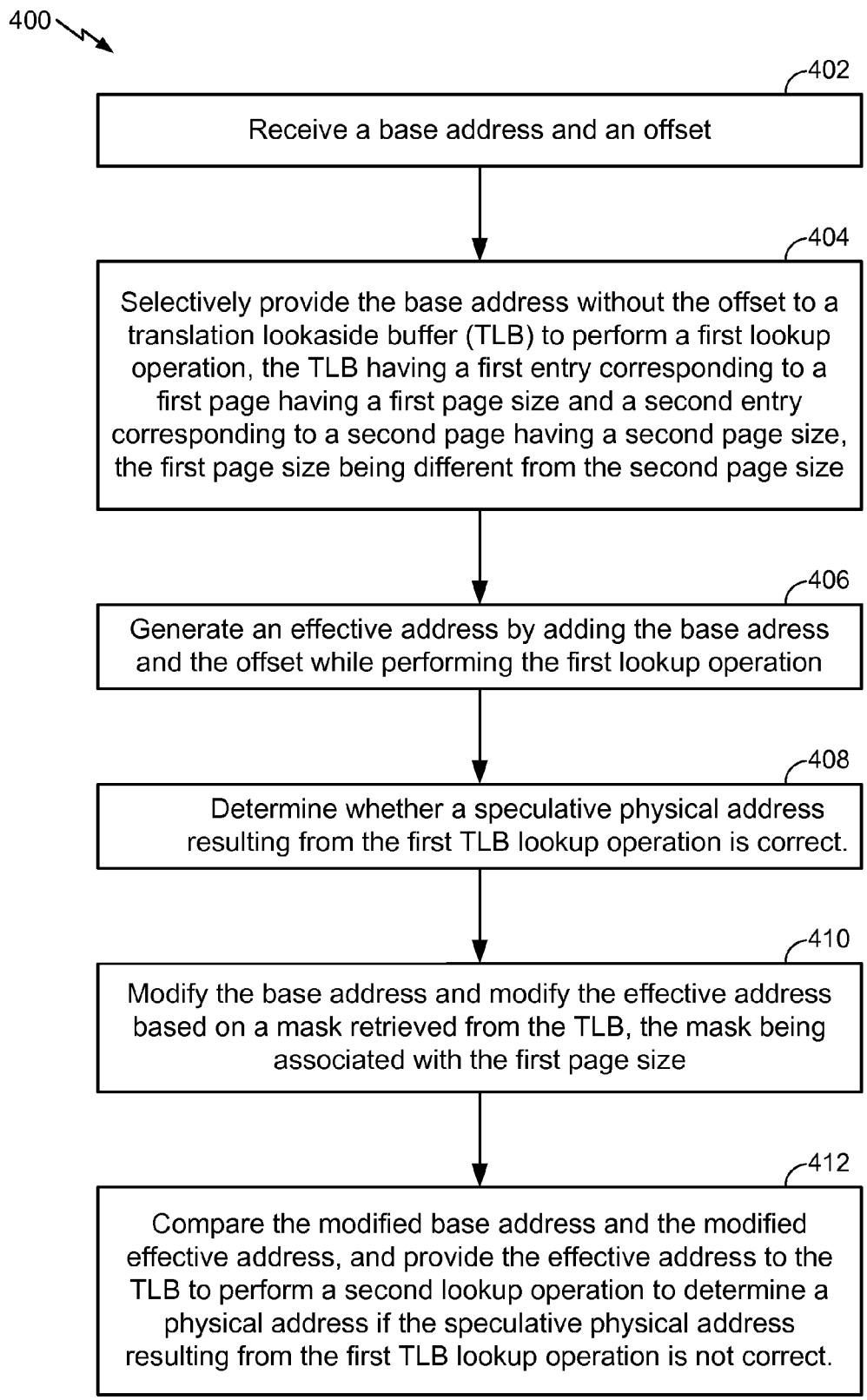
FIG. 4 is a flow chart of a particular illustrative embodiment of a method of translating virtual addresses to physical addresses in a base plus offset addressing mode.

Referring to FIG. 4, a particular illustrative embodiment of a method of translating virtual addresses to physical addresses in a base plus offset addressing mode is depicted and generally designated 400. In an illustrative embodiment, the method 400 may be performed by the system 100 of FIG. 1, the system 200 of FIG. 2, or the system 300 of FIG. 3.

At 402, a base address and an offset are received. For example, the base+offset may be received at input logic to retrieve a physical address corresponding to an effective address equal to the base+offset. Continuing to 404, the base address is selectively provided without the offset to a TLB to perform a first lookup operation. The TLB may support a variable page size memory. For example, the TLB may include a first entry corresponding to a first page having a first page size and a second entry corresponding to a second page having a second page size, where the first page size is different from the second page size.

Moving to 406, an effective address is generated by adding the base address and the offset while performing the first lookup operation. Advancing to 408, a determination is made whether a speculative physical address resulting from the first TLB lookup operation is correct. Continuing to 410, each of the base address and the effective address is modified based on a mask retrieved from the TLB. In a particular embodiment, the mask is associated with the first page size. For example, the mask may include a number of masking bits set to indicate a page cross over. The mask may be applied to the VPN of an entry in the TLB to compare with the corresponding base address, and if an entry match is detected (i.e. the masked VPN matches the base address), the mask may remove a portion of the address within a page and to preserve an address of the page.

Advancing to 412, the modified base address is compared to the modified effective address to determine whether the speculative physical address resulting from the first TLB lookup operation is valid. When the speculative physical address resulting from the first TLB lookup operation is not valid, such as when the base address and the effective address do not correspond to the same page, the effective address is provided to the TLB to perform a second lookup operation to determine a physical address. Base plus offset TLB circuits designed to operate in accordance with the method 400 or in accordance with other embodiments described herein may be incorporated in a variety of electronic devices, such as a mobile phone, a set-top box device, a computer, a personal digital assistant (PDA), a music player, a video player, any other device that stores or retrieves data or computer instructions, or any combination thereof.

Figure 5:
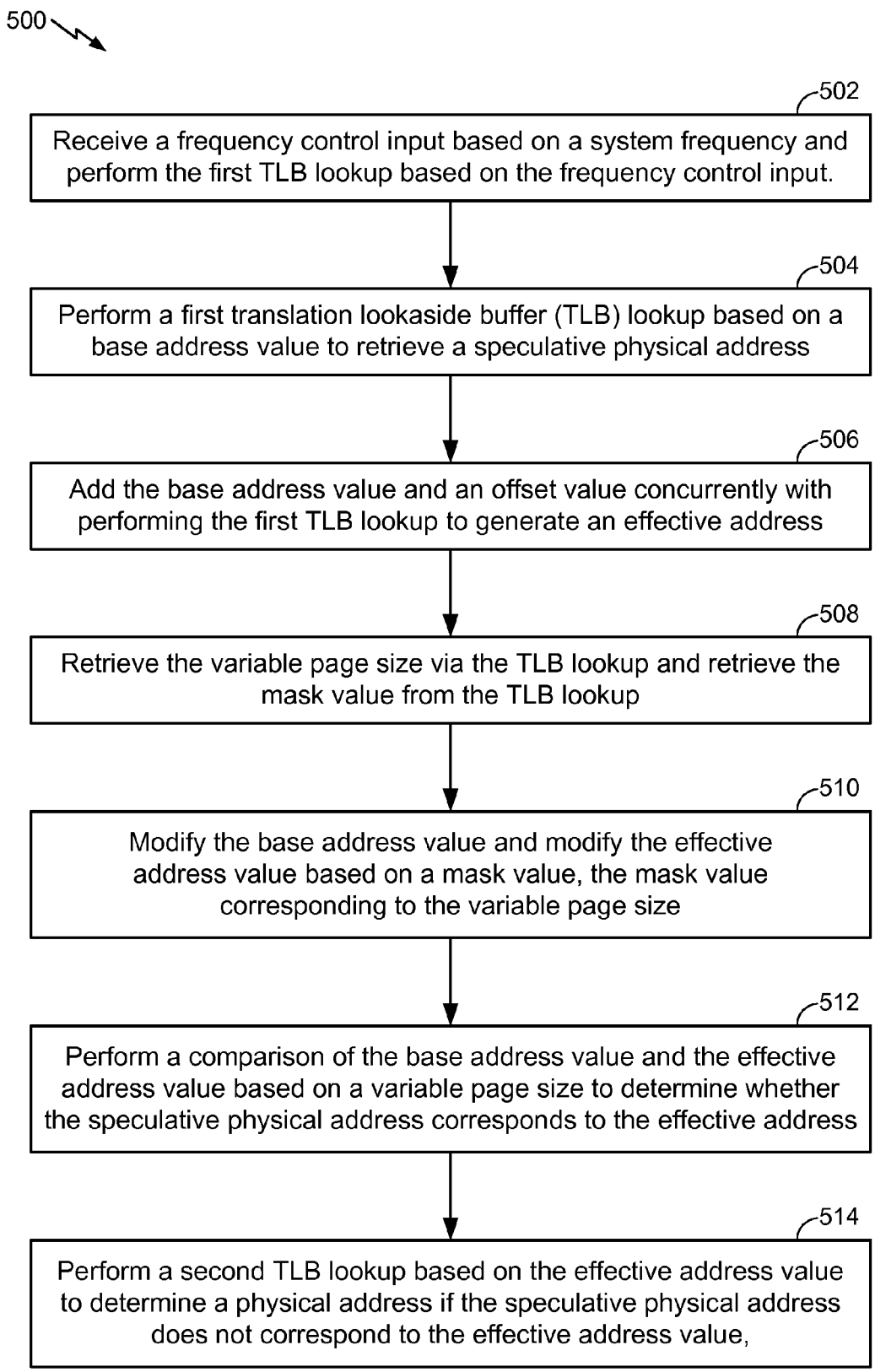
FIG. 5 is a flow chart of a second illustrative embodiment of a method of translating virtual addresses to physical addresses in a base plus offset addressing mode.

Referring to FIG. 5, a second illustrative embodiment of a method of translating virtual addresses to physical addresses in a base plus offset addressing mode is depicted and generally designated 500. In an illustrative embodiment, the method 500 may be performed by the system 100 of FIG. 1, the system 200 of FIG. 2, or the system 300 of FIG. 3.

At 502, a frequency control input based on a system frequency is received, and the first TLB lookup is performed based on the frequency control input. In a particular embodiment, system frequency may be a factor in determining whether the first TLB lookup is based on the base address or whether the first TLB lookup is based on the effective address, since a potential time savings may not be as advantageous when the system frequency is low. For example, when the system frequency is high, it may be advantageous to perform the TLB lookup based on the base address substantially concurrently with generating the effective address for the potential time savings of not having to perform an addition operation prior to the first TLB lookup. When the system frequency is low, it may be advantageous to generate the effective address and then perform the TLB lookup based on the effective address since with a low system frequency, time savings may not be as important of a factor as saving power by doing a single TLB lookup since a plurality of content addressable memory cells may be discharging during each TLB lookup.

Continuing to 504, a first TLB lookup based on a base address value is performed to retrieve a speculative physical address. In a particular embodiment, the TLB includes a first entry corresponding to a first page having a first page size and a second entry corresponding to a second page having a second page size, where the first page size is different from the second page size. Each of the first page size and the second page size may be variable.

Moving to 506, the base address value is added to an offset value concurrently with the first TLB lookup. An effective address is generated as a result of the addition of the base address value and the offset value. Advancing to 508, the variable page size is retrieved from the TLB via the first TLB lookup and the mask value is retrieved from the TLB via the first TLB lookup.

Continuing to 510, the base address value and the effective address value are each modified based on a mask value, where the mask value corresponds to the variable page size. Advancing to 512, a comparison of the base address value and the effective address value is performed based on a variable page size to determine whether the speculative physical address corresponds to the effective address.

Moving to 514, a second TLB lookup is performed based on the effective address value to determine a physical address when the speculative physical address does not correspond to the effective address value.

Figure 6:
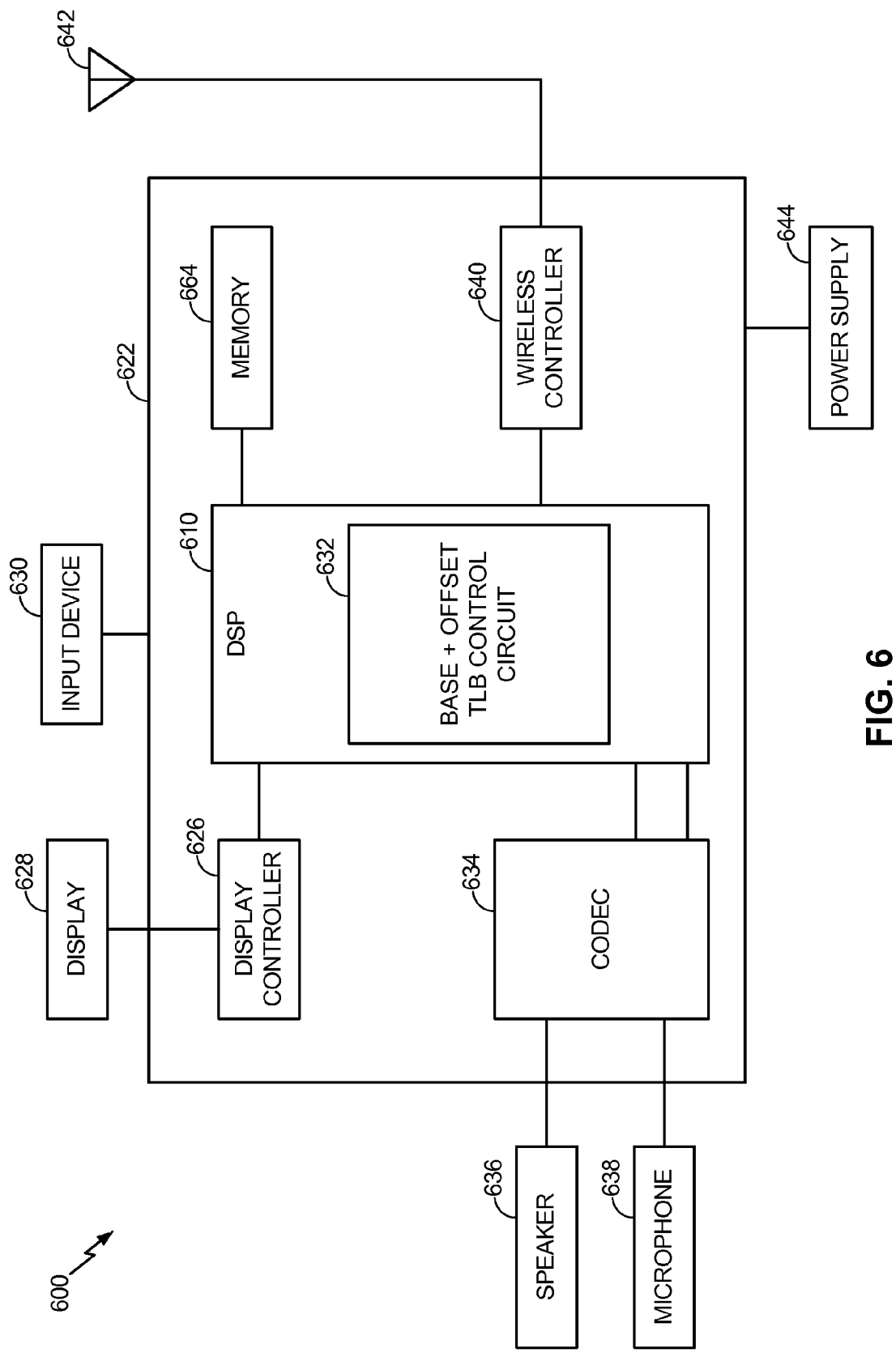
FIG. 6 is a block diagram of an illustrative electronic device that includes a base plus offset TLB control circuit.

FIG. 6 is a block diagram of an illustrative electronic device that includes a base plus offset TLB control circuit. The wireless communications device 600 includes a digital signal processor (DSP) 610 that includes a base plus offset TLB control circuit 632. In a particular embodiment, the base plus offset TLB control circuit 632 is system 100 of FIG. 1, or the system 200 of FIG. 2, or the system 300 of FIG. 3, and may operate in accordance with the method 400 of FIG. 4 or the method 500 of FIG. 5 or any combination thereof. A display controller 626 is coupled to the digital signal processor 610 and to a display 628. Moreover, an input device 630 is coupled to the digital signal processor 610. Additionally, a memory 664 is coupled to the digital signal processor 610. A coder/decoder (CODEC) 634 is also coupled to the digital signal processor 610. A speaker 636 and a microphone 638 are coupled to the CODEC 634.

FIG. 6 also indicates that a wireless controller 640 is coupled to the digital signal processor 610 and to a wireless antenna 642. The digital signal processor 610 may be configured to receive wireless data via the wireless controller 640. In a particular embodiment, a power supply 644 is coupled to the on-chip system 622. Moreover, in a particular embodiment, as illustrated in FIG. 6, the display 628, the input device 630, the speaker 636, the microphone 638, the wireless antenna 642, and the power supply 644 are external to the on-chip system 622. However, each is coupled to a component of the on-chip system 622.

Figure 7:
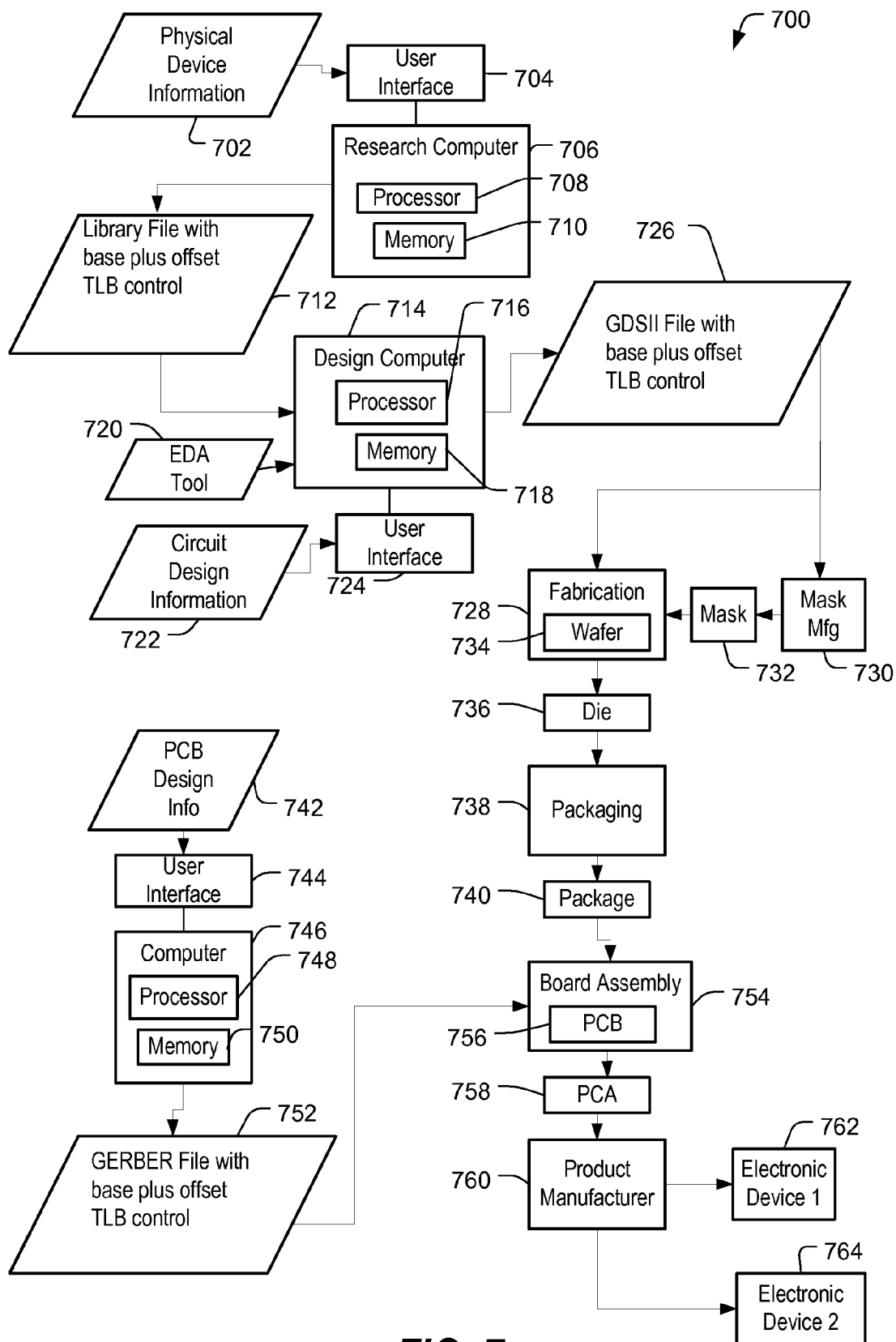
FIG. 7 is a data flow diagram of a particular illustrative embodiment of a manufacturing process to manufacture electronic devices that include base plus offset TLB control.

The foregoing disclosed devices and functionalities may be designed and configured into computer files (e.g. RTL, GDSII, GERBER, etc.) stored on computer readable media. Some or all such files may be provided to fabrication handlers who fabricate devices based on such files. Resulting products include semiconductor wafers that are then cut into semiconductor die and packaged into a semiconductor chip. The chips are then employed in devices described above. FIG. 7 depicts a particular illustrative embodiment of an electronic device manufacturing process 700.

Physical device information 702 is received in the manufacturing process 700, such as at a research computer 706. The physical device information 702 may include design information representing at least one physical property of a semiconductor device, such as device components to be used in the system 100 of FIG. 1, the system 200 of FIG. 2, the system 300 of FIG. 3, or any combination thereof. For example the physical device information 702 may include physical parameters, material characteristics, and structure information that is entered via a user interface 704 coupled to the research computer 706. The research computer 706 includes a processor 708, such as one or more processing cores, coupled to a computer readable medium such as a memory 710. The memory 710 may store computer readable instructions that are executable to cause the processor 708 to transform the physical device information 702 to comply with a file format and to generate a library file 712.

In a particular embodiment, the library file 712 includes at least one data file including the transformed design information. For example, the library file 712 may include a library of design files representing semiconductor devices that may be used in components of the system 100 of FIG. 1, the system 200 of FIG. 2, the system 300 of FIG. 3, or any combination thereof, that is provided for use with an electronic design automation (EDA) tool 720.

The library file 712 may be used in conjunction with the EDA tool 720 at a design computer 714 including a processor 716, such as one or more processing cores, coupled to a memory 718. The EDA tool 720 may be stored as processor executable instructions at the memory 718 to enable a user of the design computer 714 to design a circuit including a predictive TLB access system using base plus offset addressing, such as the system 100 of FIG. 1, the system 200 of FIG. 2, the system 300 of FIG. 3, the electronic device that includes the TLB control circuit 632 or the DSP 610 of FIG. 6, or any combination thereof. For example, a user of the design computer 714 may enter circuit design information 722 via a user interface 724 coupled to the design computer 714. The circuit design information 722 may include design information representing at least one physical property of a semiconductor device, such as device components to be used in the system 100 of FIG. 1, the system 200 of FIG. 2, the system 300 of FIG. 3, the electronic device that includes the TLB control circuit 632 or the DSP 610 of FIG. 6, or any combination thereof. To illustrate, the circuit design may include identification of particular circuits and relationships to other elements in a circuit design, positioning information, feature size information, interconnection information, or other information representing a physical property of a semiconductor device.

The design computer 714 may be configured to transform the design information, including the circuit design information 722, to comply with a file format. To illustrate, the file formation may include a database binary file format representing planar geometric shapes, text labels, and other information about a circuit layout in a hierarchical format, such as a Graphic Data System (GDSII) file format. The design computer 714 may be configured to generate a data file including the transformed design information, such as a GDSII file 726, that includes information describing the device components to be used in the system 100 of FIG. 1, the system 200 of FIG. 2, the system 300 of FIG. 3, or any combination thereof, in addition to other circuits or information. To illustrate, the data file may include information corresponding to a system-on-chip (SOC) that includes the electronic device of FIG. 6 and that also includes additional electronic circuits and components within the SOC.

The GDSII file 726 may be received at a fabrication process 728 to manufacture the device components to be used in the system 100 of FIG. 1, the system 200 of FIG. 2, the system 300 of FIG. 3, components of the electronic device of FIG. 6, or any combination thereof, according to transformed information in the GDSII file 726. For example, a device manufacture process may include providing the GDSII file 726 to a mask manufacturer 730 to create one or more masks, such as masks to be used for photolithography processing, illustrated as a representative mask 732. The mask 732 may be used during the fabrication process to generate one or more wafers 734 that may be tested and separated into dies, such as a representative die 736. The die 736 includes a circuit including the device components to be used in the system 100 of FIG. 1, the system 200 of FIG. 2, the system 300 of FIG. 3, the electronic device of FIG. 6, or any combination thereof.

The die 736 may be provided to a packaging process 738 where the die 736 is incorporated into a representative package 740. For example, the package 740 may include the single die 736 or multiple dies, such as a system-in-package (SiP) arrangement. The package 740 may be configured to conform to one or more standards or specifications, such as Joint Electron Device Engineering Council (JEDEC) standards.

Information regarding the package 740 may be distributed to various product designers, such as via a component library stored at a computer 746. The computer 746 may include a processor 748, such as one or more processing cores, coupled to a memory 750. A printed circuit board (PCB) tool may be stored as processor executable instructions at the memory 750 to process PCB design information 742 received from a user of the computer 746 via a user interface 744. The PCB design information 742 may include physical positioning information of a packaged semiconductor device on a circuit board. The packaged semiconductor device corresponds to the package 740 including the device components to be used in the system 100 of FIG. 1, the system 200 of FIG. 2, the system 300 of FIG. 3, the electronic device of FIG. 6, or any combination thereof.

The computer 746 may be configured to transform the PCB design information 742 to generate a data file, such as a GERBER file 752 with data that includes physical positioning information of a packaged semiconductor device on a circuit board, as well as layout of electrical connections such as traces and vias. The packaged semiconductor device corresponds to the package 740 including the device components to be used in the system 100 of FIG. 1, the system 200 of FIG. 2, the system 300 of FIG. 3, the electronic device of FIG. 6, or any combination thereof. In other embodiments, the data file generated by the transformed PCB design information may have a format other than a GERBER format.

The GERBER file 752 may be received at a board assembly process 754 and used to create PCBs, such as a representative PCB 756, manufactured in accordance with the design information stored within the GERBER file 752. For example, the GERBER file 752 may be uploaded to one or more machines for performing various steps of a PCB production process. The PCB 756 may be populated with electronic components including the package 740 to form a representative printed circuit assembly (PCA) 758.

The PCA 758 may be received at a product manufacture process 760 and integrated into one or more electronic devices, such as a first representative electronic device 762 and a second representative electronic device 764. As an illustrative, non-limiting example, the first representative electronic device 762, the second representative electronic device 764, or both, may be selected from the group of a set top box, a music player, a video player, an entertainment unit, a navigation device, a communications device, a personal digital assistant (PDA), a fixed location data unit, and a computer. As another illustrative, non-limiting example, one or more of the electronic devices 762 and 764 may be remote units such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. Although one or more of FIGS. 1-7 may illustrate or describe exemplary remote units according to the teachings of the disclosure, the disclosure is not limited to these exemplary illustrated units. Embodiments of the disclosure may be suitably employed in any device that includes active integrated circuitry including memory and on-chip circuitry.

Thus, the device components to be used in the system 100 of FIG. 1, the system 200 of FIG. 2, the system 300 of FIG. 3, the electronic device of FIG. 6, or any combination thereof, may be fabricated, processed, and incorporated into an electronic device, as described in the illustrative process 700. One or more aspects of the embodiments disclosed with respect to FIGS. 1-7 may be included at various processing stages, such as within the library file 712, the GDSII file 726, and the GERBER file 752, as well as stored at the memory 710 of the research computer 706, the memory 718 of the design computer 714, the memory 750 of the computer 746, the memory of one or more other computers or processors (not shown) used at the various stages, such as at the board assembly process 754, and also incorporated into one or more other physical embodiments, such as the mask 732, the die 736, the package 740, the PCA 758, other products such as prototype circuits or devices (not shown), or any combination thereof. Although various representative stages of production from a device design to a final product are depicted, in other embodiments fewer stages may be used or additional stages may be included. Similarly, the process 700 may be performed by a single entity or by one or more entities performing various stages of the process 700.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined by the following claims.

What is claimed is:

1. A method comprising:
performing a first translation lookaside buffer (TLB) lookup based on a base address value to retrieve a speculative physical address;
adding the base address value and an offset value to generate an effective address value while performing the first TLB lookup based on the base address value; and
performing a comparison of the base address value and the effective address value based on a variable page size to determine whether the speculative physical address corresponds to the effective address value.

2. The method of claim 1, further comprising retrieving the variable page size via the TLB lookup.

3. The method of claim 1, further comprising modifying the base address value and modifying the effective address value based on a mask value retrieved from the first TLB lookup to perform the comparison, the mask value corresponding to the variable page size.

4. The method of claim 3, further comprising performing a second TLB lookup based on the effective address value to determine a physical address when the speculative physical address does not correspond to the effective address value.

5. The method of claim 1, wherein performing the first TLB lookup, adding the base address value and the offset value, and performing the comparison of the base address value and the effective address value are performed at a processor integrated into an electronic device.

6. An apparatus comprising:
a semiconductor device comprising:
a control circuit configured to:
receive a base address and an offset; and
selectively provide one of the base address and an effective address, based on a frequency control signal, to a translation lookaside buffer (TLB) to perform a first lookup operation, wherein the TLB includes a first entry corresponding to a first page having a first page size and wherein the TLB includes a second entry corresponding to a second page having a second page size, the first page size different from the second page size.

7. The apparatus of claim 6, wherein the control circuit is further configured to:

determine whether to provide the one of the base address and the effect address prior to the effective address being generated; and in response to a determination to provide the base address, generate the effective address by adding the base address and the offset while the TLB performs the first lookup operation.

8. The apparatus of claim 7, wherein the control circuit comprises output logic coupled to the TLB, the output logic configured to determine whether a speculative physical address resulting from the first lookup operation is valid.

9. The apparatus of claim 8, wherein the output logic is configured to modify the base address and to modify the effective address based on a mask retrieved from the first lookup operation, wherein the mask is associated with the first page size.

10. The apparatus of claim 9, wherein the output logic comprises a comparator configured to:

receive the modified base address and the modified effective address, and compare the modified base address and the modified effective address.

11. The apparatus of claim 10, wherein the control circuit comprises input logic coupled to the TLB and coupled to the output logic, wherein the input logic is configured to selectively provide one of the base address and the effective address to the TLB.

12. The apparatus of claim 11, wherein the control circuit is further configured to provide the effective address to the TLB to perform a second lookup operation to determine a physical address when the speculative physical address resulting from the first lookup operation is not valid.

13. The apparatus of claim 11, wherein the input logic is configured to:

receive the frequency control signal based on a system frequency; and select between the base address and the effective address based on the frequency control signal.

14. The apparatus of claim 6, wherein the control circuit is disposed within a processor, and further comprising a wireless controller coupled to an antenna, wherein the processor is configured to receive wireless data via the wireless controller.

15. The apparatus of claim 6, further comprising a device selected from the group consisting of a set top box, a music player, a video player, an entertainment unit, a navigation device, a communications device, a personal digital assistant (PDA), a fixed location data unit, and a computer, into which the semiconductor device is integrated.

16. The apparatus of claim 6, wherein the control circuit is further configured to generate the effective address based on the base address and the offset.

17. A method comprising:
receiving a base address and an offset;
determining whether to provide one of the base address or an effective address, based on a frequency control signal, to a translation lookaside buffer (TLB); and
in response to a determination to provide the base address to the TLB, selectively providing the base address without the offset to the TLB to perform a first lookup operation, wherein the TLB includes a first entry corresponding to a first page having a first page size and wherein the TLB includes a second entry corresponding to a second page having a second page size, wherein the first page size is different from the second page size.

18. The method of claim 17, further comprising, in response to the determination to provide the base address to the TLB, generating the effective address by adding the base address and the offset while performing the first lookup operation.

19. The method of claim 18, further comprising determining whether a speculative physical address resulting from the first lookup operation is valid.

20. The method of claim 19, further comprising modifying the base address and modifying the effective address based on a mask retrieved from the first lookup operation, wherein the mask is associated with the first page size.

21. The method of claim 20, further comprising:
comparing the modified base address and the modified effective address; and
providing the effective address to the TLB to perform a second lookup operation to determine a physical address when the speculative physical address resulting from the first lookup operation is not valid.

22. The method of claim 17, wherein receiving the base address and the offset and selectively providing the base address without the offset to the TLB are performed at a processor integrated into an electronic device.

23. An apparatus comprising:
a translation lookaside buffer (TLB) configured to perform a first lookup operation, wherein the TLB includes a first entry corresponding to a first page having a first page size and wherein the TLB includes a second entry corresponding to a second page having a second page size, the first page size different from the second page size;
input logic coupled to the TLB, wherein the input logic is configured to:
receive a base address and an offset,
selectively provide, based on a frequency control signal, one of the base address and an effective address to the TLB to perform the first lookup operation, and
add the base address and the offset to generate the effective address, wherein the effective address is generated during the first lookup operation when the base address is provided to the TLB; and
output logic coupled to the TLB and to the input logic, the output logic configured to determine whether a speculative physical address resulting from the first lookup operation is valid.

24. The apparatus of claim 23, wherein the output logic is configured to:
receive a mask associated with the first page size,
modify both the base address and the effective address based on the mask to generate a modified base address and a modified effective address, wherein the mask is retrieved from the first lookup operation,
receive the modified base address and the modified effective address, and
compare the modified base address and the modified effective address.

25. The apparatus of claim 24, wherein the control circuit is further configured to perform a second lookup operation based on the effective address to determine a physical address in response to a determination that the speculative physical address resulting from the first lookup operation is not valid.

26. The apparatus of claim 24, wherein the input logic is further configured to receive the frequency control signal based on a system frequency.

27. The apparatus of claim 23, wherein the input logic, the TLB, and the output logic are integrated in a semiconductor device, and further comprising a device selected from the group consisting of a set top box, a music player, a video player, an entertainment unit, a navigation device, a communications device, a personal digital assistant (PDA), a fixed location data unit, and a computer, into which the semiconductor device is integrated.

28. An apparatus comprising:
a translation lookaside buffer (TLB) configured to:
provide address translations of a variable page size memory, and
perform a speculative translation of a base address;
an adder configured to:
receive the base address and an offset value, and
generate an effective address; and
a comparison circuit configured to:
perform a comparison of the base address to the effective address based on a variable page size, and
determine whether the speculative translation of the base address is valid based on the comparison.

29. The apparatus of claim 28, further comprising selection logic coupled to the adder and configured to selectively provide the base address or the effective address to the TLB.

30. The apparatus of claim 28, wherein the comparison circuit is configured to:
receive a mask associated with a first page size of the variable page size memory,
modify both the base address and the effective address based on the mask to generate a modified base address and a modified effective address, wherein the mask is retrieved from the TLB,
receive the modified base address and the modified effective address, and
compare the modified base address and the modified effective address.

31. The apparatus of claim 28, wherein the TLB, the adder, and the comparison circuit are integrated in a semiconductor device, and further comprising a device selected from the group consisting of a set top box, a music player, a video player, an entertainment unit, a navigation device, a communications device, a personal digital assistant (PDA), a fixed location data unit, and a computer, into which the semiconductor device is integrated.

32. An apparatus comprising:
means for performing a first translation lookaside buffer (TLB) lookup based on a base address value to retrieve a speculative physical address;
means for adding the base address value and an offset value to generate an effective address value while performing the first TLB lookup based on the base address value; and
means for performing a comparison of the base address value and the effective address value based on a variable page size to determine whether the speculative physical address corresponds to the effective address.

33. The apparatus of claim 32 integrated in at least one semiconductor die.

34. The apparatus of claim 32, wherein the means for performing the first TLB lookup, the means for adding, and the means for performing the comparison are integrated in a semiconductor device, and further comprising a device selected from the group consisting of a set top box, a music player, a video player, an entertainment unit, a navigation device, a communications device, a personal digital assistant (PDA), a fixed location data unit, and a computer, into which the semiconductor device is integrated.

35. A method comprising:
receiving a base address and an offset;
determining a selection of one of the base address and an effective address based on a frequency control signal; and
in response to the selection, providing the one of the base address and the effective address to a translation lookaside buffer (TLB) to perform a first lookup operation, wherein the TLB includes a first entry and a second entry, the first entry corresponding to a first page having a first page size and the second entry corresponding to a second page having a second page size, wherein the first page size is different from the second page size.

36. The method of claim 35, wherein the method is performed by a processor integrated into an electronic device.

37. A computer readable tangible medium storing instructions executable by a computer, the instructions comprising:
instructions that are executable by the computer to receive a base address and an offset; and
instructions that are executable by the computer to selectively provide one of the base address and an effective address, based on a frequency control signal, to a translation lookaside buffer (TLB) to perform a first lookup operation, wherein the TLB includes a first entry corresponding to a first page having a first page size and wherein the TLB includes a second entry corresponding to a second page having a second page size, wherein the first page size is different from the second page size.

38. The computer readable tangible medium of claim 37, wherein the instructions are executable by a processor integrated in a device selected from the group consisting of a set top box, a music player, a video player, an entertainment unit, a navigation device, a communications device, a personal digital assistant (PDA), a fixed location data unit, and a computer.

39. A method comprising:
receiving design information representing at least one physical property of a semiconductor device, the semiconductor device including a control circuit configured to:
receive a base address and an offset; and
selectively provide one of the base address and an effective address, based on a frequency control signal, to a translation lookaside buffer (TLB) to perform a first lookup operation, wherein the TLB includes a first entry corresponding to a first page having a first page size and wherein the TLB includes a second entry corresponding to a second page having a second page size, the first page size different from the second page size;
transforming the design information to comply with a file format; and
generating a data file including the transformed design information.

40. The method of claim 39, wherein the data file includes a GDSII format.

41. A method comprising:
receiving a data file including design information corresponding to a semiconductor device; and
fabricating the semiconductor device according to the design information, wherein the semiconductor device includes a control circuit configured to:
receive a base address and an offset; and
selectively provide one of the base address and an effective address, based on a frequency control signal, to a translation lookaside buffer (TLB) to perform a first lookup operation, wherein the TLB includes a first entry corresponding to a first page having a first page size and wherein the TLB includes a second entry corresponding to a second page having a second page size, the first page size different from the second page size.

42. The method of claim 41, wherein the data file includes a GDSII format.

43. A method comprising:
receiving design information including physical positioning information of a packaged semiconductor device on a circuit board, the packaged semiconductor device including a semiconductor structure comprising a control circuit configured to:
receive a base address and an offset; and
selectively provide one of the base address and an effective address, based on a frequency control signal, to a translation lookaside buffer (TLB) to perform a first lookup operation, wherein the TLB includes a first entry corresponding to a first page having a first page size and wherein the TLB includes a second entry corresponding to a second page having a second page size, the first page size different from the second page size; and
transforming the design information to generate a data file.

44. The method of claim 43, wherein the data file includes a GERBER format.

45. A method comprising:
receiving a data file including design information including physical positioning information of a packaged semiconductor device on a circuit board; and
manufacturing the circuit board configured to receive the packaged semiconductor device according to the design information, wherein the packaged semiconductor device includes a semiconductor structure comprising a control circuit configured to:
receive a base address and an offset; and
selectively provide one of the base address and an effective address, based on a frequency control signal, to a translation lookaside buffer (TLB) to perform a first lookup operation, wherein the TLB includes a first entry corresponding to a first page having a first page size and wherein the TLB includes a second entry corresponding to a second page having a second page size, the first page size different from the second page size.

46. The method of claim 45, wherein the data file includes a GERBER format.

47. The method of claim 45, further comprising integrating the circuit board into a device selected from the group consisting of a set top box, a music player, a video player, an entertainment unit, a navigation device, a communications device, a personal digital assistant (PDA), a fixed location data unit, and a computer.

48. A non-transitory computer-readable medium storing processor-executable instructions that, when executed by a processor, cause the processor to:
perform a first translation lookaside buffer (TLB) lookup based on a base address value to retrieve a speculative physical address;
add the base address value and an offset value to generate an effective address value while performing the first TLB lookup based on the base address value; and
perform a comparison of the base address value and the effective address value based on a variable page size to determine whether the speculative physical address corresponds to the effective address value.

49. The non-transitory computer-readable medium of claim 48, further comprising processor-executable instructions that, when executed by the processor, cause the processor to retrieve the variable page size via the first TLB lookup.

50. The non-transitory computer-readable medium of claim 48, further comprising processor-executable instructions that, when executed by the processor, cause the processor to modify the base address value and modify the effective address value based on a mask value retrieved from the first TLB lookup to perform the comparison, the mask value corresponding to the variable page size.

51. The non-transitory computer-readable medium of claim 50, further comprising processor-executable instructions that, when executed by the processor, cause the processor to perform a second TLB lookup based on the effective address value to determine a physical address when the speculative physical address does not correspond to the effective address value.

52. An apparatus comprising:
means for receiving a base address and an offset; and
means for selectively providing one of the base address and an effective address, based on a frequency control signal, to a translation lookaside buffer (TLB) to perform a first lookup operation, wherein the TLB includes a first entry corresponding to a first page having a first page size and wherein the TLB includes a second entry corresponding to a second page having a second page size, the first page size different from the second page size.

53. The apparatus of claim 52, further comprising means for generating the effective address based on the base address and the offset.

54. The apparatus of claim 52, further comprising means for determining whether to provide one of the base address or the effective address prior to the effective address being generated.

55. The apparatus of claim 52, further comprising means for determining whether a speculative physical address resulting from the first lookup operation is valid.

56. The apparatus of claim 52, further comprising means for modifying the base address and modifying the effective address based on a mask retrieved from the first lookup operation, wherein the mask is associated with the first page size.

57. The apparatus of claim 56, further comprising:
means for receiving the modified base address and the modified effective address; and
means for comparing the modified base address and the modified effective address.

58. The apparatus of claim 52, further comprising means for providing the effective address to the TLB to perform a second lookup operation to determine a physical address when a speculative physical address resulting from the first lookup operation is invalid.

59. The apparatus of claim 52, further comprising:
means for receiving the frequency control signal based on a system frequency; and
means for selecting between the base address and the effective address based on the frequency control signal.

60. A method comprising:
receiving design information representing at least one physical property of a semiconductor device, the semiconductor device including a comparison circuit configured to:
perform a comparison of a base address to an effective address based on a variable page size, and
determine whether a speculative translation of the base address is valid based on the comparison;
transforming the design information to comply with a file format; and
generating a data file including the transformed design information.

61. The method of claim 60, wherein the data file includes a GDSII format.

62. The method of claim 60, wherein the data file includes a GERBER format.

63. The method of claim 60, further comprising fabricating the semiconductor device.

64. The method of claim 60, wherein the design information includes physical positioning information of a packaged semiconductor device on a circuit board, the packaged semiconductor device including the semiconductor device.

65. The method of claim 60, further comprising manufacturing the circuit board, the circuit board configured to receive the packaged semiconductor device according to the design information.

* * * * *